3,448,177
PROCESS FOR THE MANUFACTURE OF CONDUCTING POLYMERS BY TREATING POLYMERIC COMPOUND CONTAINING BASIC GROUPS WITH MIXTURE OF 7,7,8,8-TETRACYANOQUINODIMETHANE AND α,α,α',α'-TETRACYANO-p-XYLENE
Eric Paul Goodings and John Graham Allen, Runcorn, England, assignors to Imperial Chemical Industries Limited, London, England, a corporation of Great Britain
No Drawing. Filed Oct. 10, 1966, Ser. No. 585,248
Claims priority, application Great Britain, Oct. 19, 1965, 44,268/65
Int. Cl. C08f 33/08, 7/12, 15/02
U.S. Cl. 260—895         10 Claims

ABSTRACT OF THE DISCLOSURE

A process for the preparation of electrically conducting polymers, wherein a polymeric material containing a plurality of basic groups in or on the polymer chain, or a salt thereof, is treated with a mixture of 7,7,8,8-tetracyanoquinodimethane and α,α,α',α'-tetracyano-p-xylene.

---

This invention relates to a polymer process, more especially for the preparation of conducting polymers.

We have found that the electrical conducting properties of a polymer containing a plurality of basic groups, or a salt thereof, are considerably enhanced upon treatment with a mixture of 7,7,8,8-tetracyanoquinodimethane and α,α,α',α'-tetracyano-p-xylene.

Thus, according to the present invention, we provide a process for the preparation of electrically conducting polymers, wherein a polymeric material containing a plurality of basic groups in or on the polymer chain, or a salt thereof, is treated with a mixture of 7,7,8,8-tetracyanoquinodimethane and α,α,α',α'-tetracyano-p-xylene.

The polymeric materials suitable for treatment according to the process of our invention are those containing a plurality of basic groups in or on the polymer chain, including homopolymers, copolymers, and blends and mixtures thereof.

Examples of polymeric materials, and salts thereof, suitable for the process of our invention include the homopolymers and salts, and copolymers and salts of 2-vinylpyridine, N,N-diethylaminoethylmethacrylate, N,N-dimethylaminoethylmethacrylate, vinyl-N,N-diethylaminoacetate and ethyleneimine, for example the homopolymers poly(2-vinylpyridine), poly(N,N-diethylaminoethylmethacrylate), poly(N,N-dimethylaminoethylmethacrylate), poly(vinyl-N,N-diethylaminoacetate) and polyethyleneimine, the copolymer of styrene and 2-vinylpyridine, and the iodide, sulphate and methosulphate of poly(1-methyl-2-vinylpyridine) and of poly(1-n butyl-2-vinylpyridine), and blends or mixtures of such homopolymers, copolymers and salts, for example a blend of poly(2-vinylpyridine) and poly(N,N-dimethylaminoethylmethacrylate).

The 7,7,8,8-tetracyanoquinodimethane is the compound also known as 7,7,8,8-tetracyanoquinonedimethane, and is represented by the following Formula I, which has no steric significance:

I 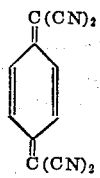

The 7,7,8,8-tetracyanoquinodimethane will hereinafter be referred to as TCNQ.

The α,α,α',α'-tetracyano-p-xylene is the compound also known as p-phenylenedimalononitrile, and is represented by the following Formula II, which has no steric significance:

II 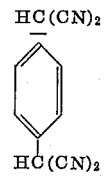

The α,α,α',α'-tetracyano-p-xylene may be prepared by the action of a mild reducing agent on TCNQ, for example by the reaction of TCNQ with mercaptoacetic acid (SH·CH$_2$COOH) in glacial acetic acid under reflux conditions as described by Acker and Hertler (Journal of the American Chemical Society, 1962, 84, 3370).

The α,α,α',α'-tetracyano-p-xylene will hereinafter be referred to as H$_2$TCNQ.

For the process of our invention we have found that TCNQ and H$_2$TCNQ in the ratios of 1 to 3 moles of TCNQ per mole of H$_2$TCNQ are preferred. Molar ratios of TCNQ to H$_2$TCNQ outside this range may be used, if desired, although it may be found that reduced conductivities are obtained thereby. It is preferred to use molar proportions of TCNQ to H$_2$TCNQ in the range 2:1 to 3:1 for best results.

The polymer is preferably present in the proportions of from 2 to 6 moles of polymer basic unit, or salt thereof, per mole of H$_2$TCNQ. Larger or smaller proportions of polymeric base, or salt thereof, may be used, although this may not achieve any advantage as far as the electrical conducting properties of the resultant polymers are concerned and may even result in lower conductivities. It is preferred to use the proportion of 2 moles of polymer basic unit, or salt thereof, per mole of H$_2$TCNQ, to give the best conductivities.

The process of our invention is best carried out in solution. Suitable solvents are those in which the polymer, TCNQ and the H$_2$TCNQ are all soluble. Examples include dimethylformamide, mixtures of acetonitrile and ethanol, acetonitrile and chloroform, acetonitrile and water (suitable when the polymer is in the form of its salt), and benzene.

It has been found particularly advantageous to use a solvent in which the product of the reaction is also soluble, for example dimethylformamide. It has also been found advantageous, for economic reasons, to use the minimum amount of solvent necessary to give complete solution of the reactants at the reaction temperature, but greater quantities of solvent may be used, if desired.

The temperature for the reaction is not critical, and it has been found convenient to carry out the reaction at room temperature. However, in certain cases, particularly where solvents other than dimethylformamide are being used, higher temperatures may be required to maintain the starting materials in solution. In general, temperatures up to the reflux temperature of the reaction mixture may be used without detriment to the properties of the product.

The process may be effected at substantially atmospheric pressure.

It has been found advantageous to conduct the process in the substantial absence of air, for example by employing an atmosphere of inert gas, for example, nitrogen, throughout the process. By an inert gas we mean one which does not react with any of the other compounds used in this process.

The time required for reaction is dependent on various factors, including the particular polymeric base used as a starting material and the concentrations of reactants. In most cases, however, the reaction is quick, and, in general, reaction times within the range ½ hour to 2 hours have been found sufficient and shorter reaction times may be adequate in some circumstances.

The polymers resulting from the process, as herein described, may be isolated by conventional techniques, for example by pouring the reaction mixture into a liquid in which the polymer is insoluble or only sparingly soluble, for example diethyl ether, by distilling off the solvent, or, where solvents have been used wherein the product is insoluble or only sparingly soluble, by filtering off the precipitated product. Care should be exercised in choosing the non-solvents as many may be found to have a detrimental effect on the conductivities of the products. We have found diethyl ether to be satisfactory.

In the preferred embodiment of our invention the polymeric base is dissolved in dimethylformamide and treated with a mixture of TCNQ and $H_2TCNQ$ in dimethylformamide solution, under an atmosphere of nitrogen.

The proportions are preferably 2 moles of polymer basic unit, to 1 mole of $H_2TCNQ$ to 2 to 3 moles of TCNQ. The mixture is allowed to react for from ½ hour to 2 hours after which time the polymer is isolated by pouring the reaction mixture into diethyl ether and filtering off the precipitate.

The polymers produced according to the process of our invention are electrically conducting. For example, with poly(2-vinylpyridine) as the starting material, a polymer of conductivity $1.91 \times 10^{-2}$ mho cm.$^{-1}$ may be obtained, with poly(1-methyl-2-vinylpyridinium iodide) as the starting material, a polymer of conductivity $1.7 \times 10^{-3}$ mho cm.$^{-1}$ may be obtained, and with the copolymer of styrene and 2-vinylpyridine as the starting material, a polymer of conductivity $2.84 \times 10^{-3}$ mho cm.$^{-1}$ may be obtained. By way of comparison, the untreated polymeric bases all have conductivities considerably less than $10^{-7}$ mho cm.$^{-1}$.

It is preferred to store the polymers in the absence of air, for example in an inert atmosphere, for example nitrogen, to avoid any loss in conductivity which may be found to occur on exposure to air.

Such polymers may be used, for example, as conducting films for heating panels. It is preferred that the polymers be protected from air in use, for example by encapsulation in suitable polymeric material, for example "Melinex" (registered trademark) polyester film.

The invention is illustrated, but not in any way limited, by the following examples, in which all proportions are in parts by weight unless otherwise stated.

In the examples, all the conductivities quoted were measured by the four-point probe method as described by L. B. Valdes (Proceedings of the Institute of Radio Engineers (1954), 42, 420–427) on compressed discs of polymer powder at 20° C.

Example 1

A mixture containing $H_2TCNQ$ (103 parts, 1 equivalent), TCNQ (204 parts, 2 equivalents) and dry dimethylformamide (4,750 parts) was heated to 100° C. whilst agitated by a stream of dry nitrogen in a reaction vessel provided with a reflux condenser, a tap funnel, and a nitrogen bleed tube. Heating was carried out on an oil bath.

Atactic poly(2-vinylpyridine), having an intrinsic viscosity at 25° C. in ethanol of 1.76 decilitres$^{-1}$ gm. and a molecular weight, measured by a light scattering method using benzene as solvent, of 1,730,000±50,000 (105 parts, 2 equivalents) was dissolved in dry dimethylformamide (2,500 parts) and the resulting solution was introduced into the reaction vessel via the tap funnel. The dark green solution produced was heated quickly to its reflux temperature (150° C.) and maintained at this temperature for 30 minutes, after which time it was allowed to cool to room temperature. The cooled solution was poured into dry, peroxide-free diethyl ether (distilled from calcium hydride) (21,450 parts). A blue-black solid precipitated leaving a green supernatant liquid. The solid was removed by filtration, washed with dry diethyl ether until the washings were colourless, dried under vacuum for 1 hour at room temperature and then for a further 16 hours at 48° C.

346 parts of a product were obtained having a decomposition range of 184° C.–202° C. and a conductivity of $1.91 \times 10^{-2}$ mho, cm.$^{-1}$.

Example 2

Isotactic poly(2-vinylpyridine), having an intrinsic viscosity, measured in dimethyl formamide at 25° C., of 0.64 decilitres gm.$^{-1}$ and a crystallinity, as determined by X-ray diffraction, of 35%, prepared according to the method described by Natta, Mazzanti, Longi, Dall'asta and Beruadini in J. Polymer Science (1961), 51, 487, (105 parts, 2 equivalents), was dissolved in air-free dimethylformamide (2,500 parts) and was added with stirring under an atmosphere of nitrogen to a solution of $H_2TCNQ$ (103 parts, 1 equivalent) and TCNQ (102 parts, 1 equivalent) in dimethylformamide (5,000 parts) maintained at 20° C.

The mixture rapidly formed a gel and anhydrous, peroxide-free diethyl ether (distilled from calcium hydride) (18,000 parts) was added to the stirred mixture to give a bluish-black precipitate. The solid material was collected by filtration under an atmosphere of nitrogen, washed with ether until the washings were colourless and dried under vacuum at 45° C.

The product (265 parts) melted over the range 164–180° C., with slight decomposition at 120° C. and had a conductivity of $6.22 \times 10^{-3}$ mho cm.$^{-1}$ and a magnetic susceptibility of $0.903 \times 10^{-6}$ e.m.u. per gram.

Example 3

Isotactic poly(2-vinylpyridine) (105 parts, 2 equivalents) was treated with a mixture of TCNQ (204 parts, 2 equivalents) and $H_2TCNQ$ (103 parts, 1 equivalent) following essentially the same procedure as that described in Example 2. 335 parts of a black powder were obtained which melted over the range 165–184° C., with some decomposition over the range 122–130° C. The product had a conductivity of $1.7 \times 10^{-2}$ mho cm.$^{-1}$ and a magnetic susceptibility of $1.062 \times 10^{-6}$ e.m.u. per gram.

Example 4

145 parts (3.3 equivalents) of actactic poly(2-vinylpyridine), having an intrinsic viscosity measured in ethanol at 25° C., of 1.76 decilitres gm.$^{-1}$, in which 37.7% of the basic groups had been quaternished by treatment with n-butyl iodide, were dissolved in dimethylformamide (10,000 parts) and the solution was added to a stirred mixture of $H_2TCNQ$ (52 parts, 1 equivalent), TCNQ (153 parts, 2.5 equivalents) and dimethylformamide (8,000 part). The reaction mixture was maintained at a temperature of 80° C. under an atmosphere of nitrogen during the addition and for a further period of 1 hour.

The reaction mixture was then cooled to room temperature and poured into dry, peroxide-free diethyl ether (distilled from calcium hydride) (35,000 parts) when a black solid was precipitated. The product was isolated by filtration, washed with ether until the washings were colourless and dried under vacuum.

250 parts of a product were obtained, melting over the range 173–194° C. and having a conductivity of $1.2 \times 10^{-3}$ mho cm.$^{-1}$.

Example 5

Atactic poly(2-vinylpyridine), having an intrinsic viscosity, measured in ethanol at 25° C., of 1.76 decilitres gm.$^{-1}$, (126 parts, 6 equivalents) was treated with TCNQ (122 parts, 3 equivalents) and $H_2TCNQ$ (41 parts, 1 equivalent) by the procedure described in Example 4, except that a reaction time of ½ hour was employed.

220 parts of a black, amorphous powder were obtained having a melting point of 181° C. and a conductivity of $2.1 \times 10^{-4}$ mho cm.$^{-1}$.

Example 6

105 parts (2 equivalents) of a copolymer, having an intrinsic viscosity measured in chloroform at 25° C., of 1.484 decilitres gm.$^{-1}$, derived from styrene (51.6 mole percent) and 2-vinylpyridine (48.4 mole percent) were dissolved in dimethylformamide (5,000 parts) and added to a stirred mixture of H$_2$TCNQ (52 parts, 1 equivalent) and TCNQ (153 parts, 3 equivalents). The reaction mixture was maintained at 80–100° C. under nitrogen during the addition and then for a further 30 minutes.

The resulting dark green solution was cooled at 20° C. and poured into dry, peroxide-free diethyl ether (distilled from calcium hydride) (35,000 parts) when a black solid was precipitated leaving a dark green supernatant liquid. The product was filtered off, washed thoroughly with ether and dried in a vacuum. 280 parts of a product were obtained melting over the range 185–207° C. and having a conductivity of $2.9 \times 10^{-3}$ mho cm.$^{-1}$.

Example 7

Poly(N,N - dimethylaminoethylmethacrylate) (105 parts, 2 equivalents) was dissolved in dimethylformamide (5,000 parts) under an atmosphere of nitrogen and added, at a temperature of 80–90° C., to a stirred mixture of H$_2$TCNQ (69 parts, 1 equivalent), TCNQ (204 parts, 3 equivalents) and dimethylformamide (5,000 parts), the reaction mixture being maintained at 90° C. for a further one hour.

The resulting dark green solution was cooled to 20° C. and poured into diethyl ether (distilled from calcium hydride) (22,000 parts) to give a very dark blue-green solid which was filtered off under nitrogen, washed thoroughly with air-free ether and dried under vacuum at 50° C.

280 parts of a powder were obtained having a conductivity of $1.43 \times 10^{-3}$ mho cm.$^{-1}$.

Example 8

A mixture of poly(2-vinylpyridine) (53 parts, 1 equivalent) and poly(N,N-dimethylaminoethylmethacrylate) (79 parts, 1 equivalent) was dissolved in dimethylformamide (5,000 parts) and the solution added, at a temperature of 80–90° C., to a stirred solution of H$_2$TCNQ (103 parts, 1 equivalent) and TCNQ (255 parts, 2.5 equivalents) in dimethylformamide (5,000 parts). The mixture was maintained at 90° C., under nitrogen for 1 hour.

The solution was then allowed to cool to room temperature and poured into excess diethyl ether, distilled from calcium hydride, to give a blue-black solid which was filtered off, washed with ether, and dried under vacuum at 50° C.

380 parts of a product were obtained having a conductivity of $1.62 \times 10^{-3}$ mho cm.$^{-1}$.

Example 9

To a stirred mixture of H$_2$TCNQ (52 parts, 1 equivalent) and TCNQ (153 parts, 3 equivalents), dissolved in dimethylformamide (2,500 parts) and heated to 90° C. under nitrogen, was added a solution of poly(vinyl-N,N-diethylaminoacetate) (79 parts, 2 equivalents) in dimethylformamide (5,000 parts). The mixture was maintained at 90° C. for one hour, then cooled to 20° C. and poured into excess, dry, peroxide-free diethyl ether, distilled from calcium hydride. The resulting purple-black precipitate was collected by filtration, washed with ether and dried under vacuum at 50° C.

205 parts of a dark green-blue solid were produced, having a conductivity of $3.4 \times 10^{-4}$ mho cm.$^{-1}$.

Example 10

A mixture of H$_2$TCNQ (52 parts, 1 equivalent) and TCNQ (102 parts, 2 equivalents), under an atmosphere of dry nitrogen, were dissolved in boiling dry acetonitrile (10,000 parts) and, when complete dissolution was obtained, ethanol (2,000 parts) was added. To this solution were added 53 parts (2 equivalents) of atactic poly(2-vinylpyridine), having an intrinsic viscosity in ethanol at 25° C. of 1.27 decilitres gm.$^{-1}$, in solution in a nearly boiling mixture of acetonitrile (5,000 parts) and ethanol (1,500 parts).

The resulting homogeneous, dark green solution was boiled under reflux. After 5 minutes a dark solid began to separate out, and after 30 minutes the mixture was cooled and the resulting black, gelatinous mass was collected by filtration, washed with acetonitrile and then with diethyl ether and dried. 137 parts of a product were obtained, melting over the range 178–186° C. and having a conductivity of $2.25 \times 10^{-3}$ mho cm.$^{-1}$.

Example 11

A mixture of H$_2$TCNQ (52 parts, 1 equivalent) and TCNQ (102 parts, 2 equivalents) was dissolved, under nitrogen, in a boiling mixture of acetonitrile (10,000 parts) and chloroform (22,500 parts). To this solution there was added a copolymer (105 parts, 2 equivalents) of styrene (51.6 mole percent) and 2-vinylpyridine (48.4 mole percent) dissolved in chloroform (1,500 parts) and acetonitrile (500 parts). A black gelatinous precipitate separated out from the reaction mixture, and was collected by filtration, washed with diethyl ether, and dried under vacuum.

A black, amorphous solid (178 parts) was obtained, melting above 300° C. and having a conductivity of $4 \times 10^{-7}$ mho cm.$^{-1}$.

Example 12

Atactic poly(2-vinylpyridine) having an intrinsic viscosity, measured in ethanol at 25° C., of 1.76 decilitres gm.$^{-1}$ (105 parts, 2 equivalents) was dissolved in benzene (8,800 parts) and the solution was added to a stirred mixture of H$_2$TCNQ (103 parts, 1 equivalent), TCNQ (204 parts, 2 equivalents) and benzene (8,800 parts) at 80° C. under nitrogen. The mixture was boiled under reflux for 30 minutes and then the solvent was distilled off leaving a solid residue having a melting point of 179° C. and a conductivity of $1.37 \times 10^{-4}$ mho cm.$^{-1}$.

Example 13

Atactic poly(2-vinylpyridine), having an intrinsic viscosity, measured in ethanol at 25° C. of 1.27 decilitres gm.$^{-1}$, was quaternised with methyl iodide to give poly(1-methyl-2-vinylpyridinum iodide) in which 76.1% of the nitrogen atoms were alkylated. 124 parts (2.3 equivalents) of this product were dissolved in water (3,000 parts) and added to a mixture of H$_2$TCNQ (52 parts, 1 equivalent), TCNQ (153 parts, 3 equivalents) and acetonitrile (8,000 parts) boiling in an atmosphere of nitrogen. The resulting solution was boiled under reflux for 2 hours, cooled to 20° C. and the black gel which separated was filtered off, washed with acetonitrile and then diethyl ether and dried under vacuum at 40° C.

A dark green solid (243 parts) was obtained, melting at 187° C. and having a conductivity of $2.13 \times 10^{-5}$ mho cm.$^{-1}$.

Example 14

A solution of poly(1-methyl-2-vinylpyridinium iodide) (as employed in Example 13) (58 parts, 2.2 equivalents) in dimethylformamide (2,000 parts) was added, under nitrogen, to a solution of H$_2$TCNQ (26 parts, 1 equivalent) and TCNQ (77 parts, 3 equivalents) in dimethylformamide (4,000 parts) at a temperature of 85° C. The mixture was maintained at 85° C. for ½ hour and then poured into stirred diethyl ether (distilled from calcium hydride) (14,280 parts) to give a dark, green-blue precipitate which was filtered off, washed with diethyl ether and dried under vacuum at 45° C.

83 parts of a product were obtained, melting over the range 171–177° C. and having a conductivity of $1.7 \times 10^{-4}$ mho cm.$^{-1}$.

Example 15

To a solution of $H_2TCNQ$ (52 parts, 1 equivalent) and TCNQ (102 parts, 2 equivalents) in dimethylformamide (3,000 parts,) heated to 80–90° C. under an atmosphere of nitrogen was added a solution of 53 parts (2 equivalents) of atactic poly(2-vinylpyridine), having an intrinsic viscosity measured in ethanol at 25° C. of 1.76 decilitres gm.$^{-1}$ in dimethylformamide (2,500 parts). The mixture was heated for ½ hour at 90° C., allowed to cool and poured into diethyl ether (distilled from calcium hydride) (18,000 parts). The precipitate fromed was filtered off, washed with diethyl ether and dried under vacuum at 45° C. A purple, amorphous product (160 parts), was obtained, melting at 184° C., and having a conductivity of $1 \times 10^{-3}$ mho cm.$^{-1}$.

Example 16

To a stirred, cold solution of $H_2TCNQ$ (103 parts, 1 equivalent) and TCNQ (204 parts, 2 equivalents) in dimethylformamide (5,000 parts), maintained at 20° C. under an atmosphere of nitrogen, was added a solution of atactic poly(2-vinylpyridine) having an intrinsic viscosity measured in ethanol at 25° C., of 1.76 decilitres gm.$^{-1}$, (105 parts, 2 equivalents) in dimethylformamide (3,000 parts). The mixture rapidly formed a gel to which dry, peroxide-free diethyl ether (distilled from calcium hydride) (18,000 parts) was added with agitation to give a blue-black precipitate which was filtered off, washed with diethyl ether until the washings were colourless and dried under vacuum.

The product (343 parts) had a conductivity of $1.68 \times 10^{-2}$ mho cm.$^{-1}$ and a magnetic susceptibility of $0.729 \times 10^{-6}$ e.m.u. per gram.

What we claim is:

1. A process for the preparation of electrically conducting polymers wherein a polymeric material containing a plurality of basic groups is contacted with a mixture of 7,7,8,8-tetracyanoquinodimethane and $\alpha,\alpha,\alpha',\alpha'$-tetracyano-p-xylene.

2. A process according to claim 1 wherein the molar ratios of 7,7,8,8-tetracyanoquinodimethane to $\alpha,\alpha,\alpha',\alpha'$-tetracyano-p-xylene are in the range 1:1 to 3:1.

3. A process according to claim 2 wherein the molar ratios of 7,7,8,8-tetracyanoquinodimethane to $\alpha,\alpha,\alpha',\alpha'$-tetracyano-p-xylene are in the range 2:1 to 3:1.

4. A process according to claim 1 wherein the molar ratios of polymer basic units to $\alpha,\alpha,\alpha',\alpha'$-tetracylano-p-xylene are in the range 2:1 to 6:1.

5. A process according to claim 4 wherein the molar ratio of polymer basic units to $\alpha,\alpha,\alpha',\alpha'$-tetracyano-p-xylene is 2:1.

6. A process according to claim 1 when effected in the presence of a liquid medium which is a solvent for the polymer base, the 7,7,8,8-tetracyanoquinodimethane and the $\alpha,\alpha,\alpha',\alpha'$-tetracyano-p-xylene.

7. A process according to claim 6 wherein the liquid medium is selected from the group consisting of dimethyl formamide, benzene, a mixture of acetonitrile and ethanol, a mixture of acetonitrile and chloroform and a mixture of acetonitrile and water.

8. A process according to claim 1 when effected under an atmosphere of nitrogen.

9. A process according to claim 1 wherein a product is isolated by pouring the reaction mixture into diethyl ether.

10. A process according to claim 1 wherein the polymeric material containing a plurality of basic groups is selected from the group consisting of poly(2-vinylpyridine), poly(N,N - dimethylaminoethylmethacrylate, poly(vinyl-N,N-diethylaminoacetate), a copolymer of styrene and 2-vinyl-pyridine and a blend of poly(2-vinylpyridine) and poly(N,N - dimethylaminoethylmethacrylate).

References Cited

UNITED STATES PATENTS 3,346,444  10/1967  Lupinski et al. _____ 161—213

JAMES A. SEIDLECK, *Primary Examiner.*

C. A. HENDERSON, JR., *Assistant Examiner.*

U.S. Cl. X.R.

252—500; 260—2, 78.4, 88.1, 88.3, 89.1, 89.5